Aug. 21, 1923.
1,465,865
W. A. PUE ET AL
MEAT CUTTER
Original Filed March 24, 1922  4 Sheets-Sheet 1
Fig. 1.
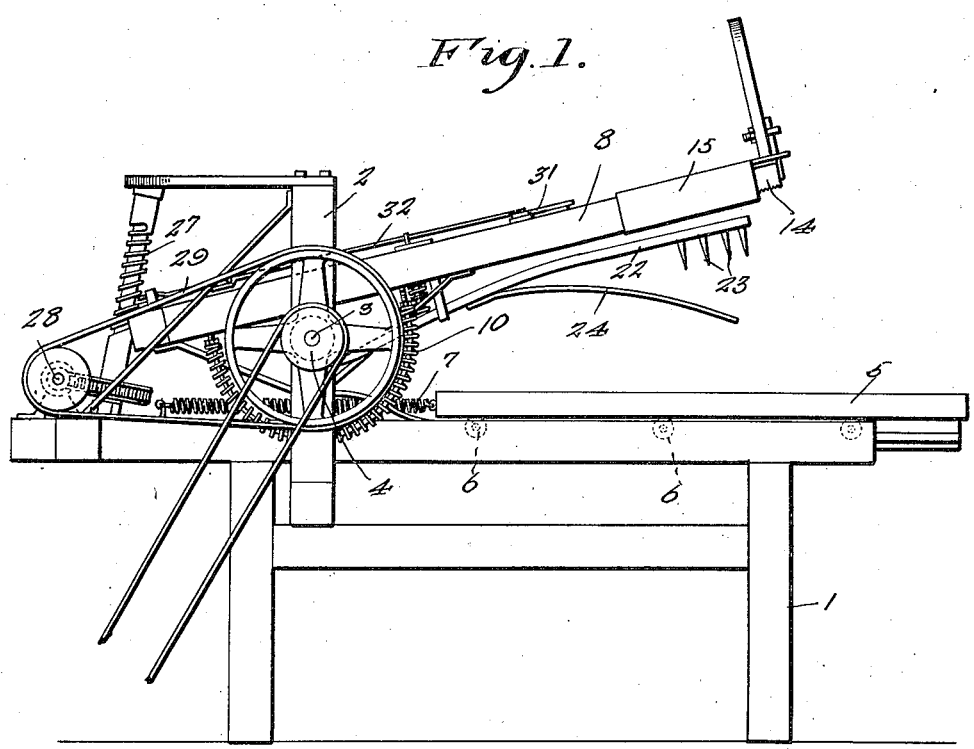
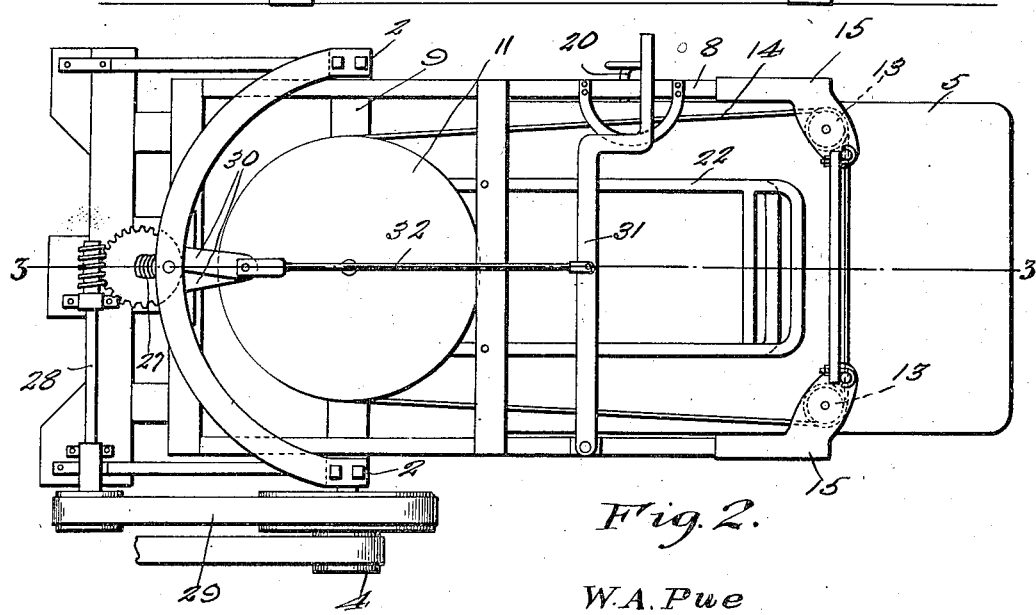
Fig. 2.
W. A. Pue
W. N. Sifford  INVENTOR
BY  Victor J. Evans  ATTORNEY
WITNESSES

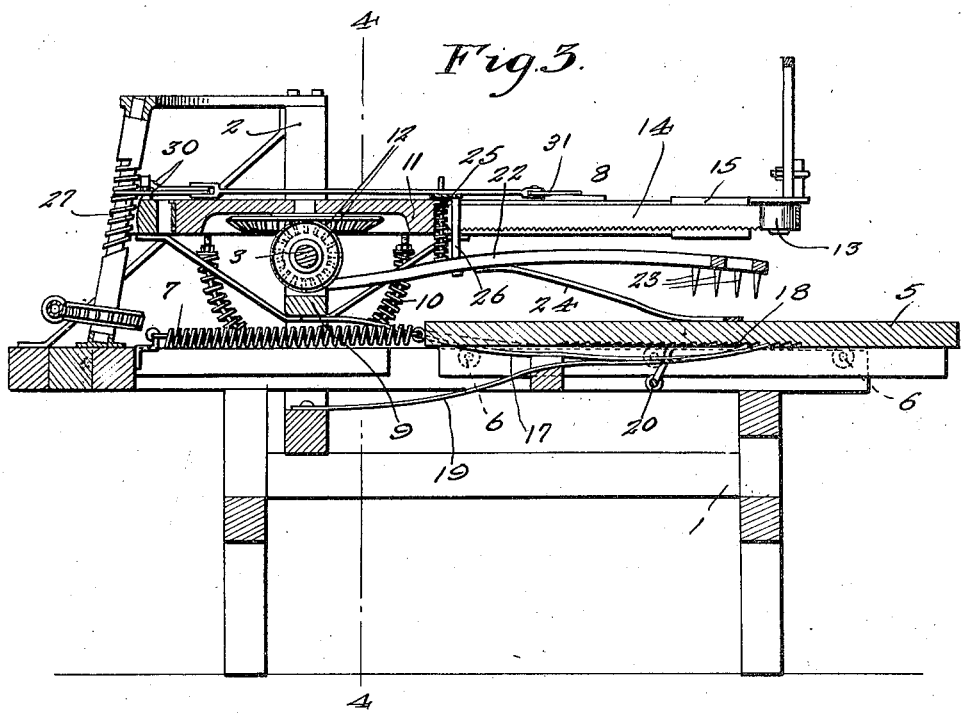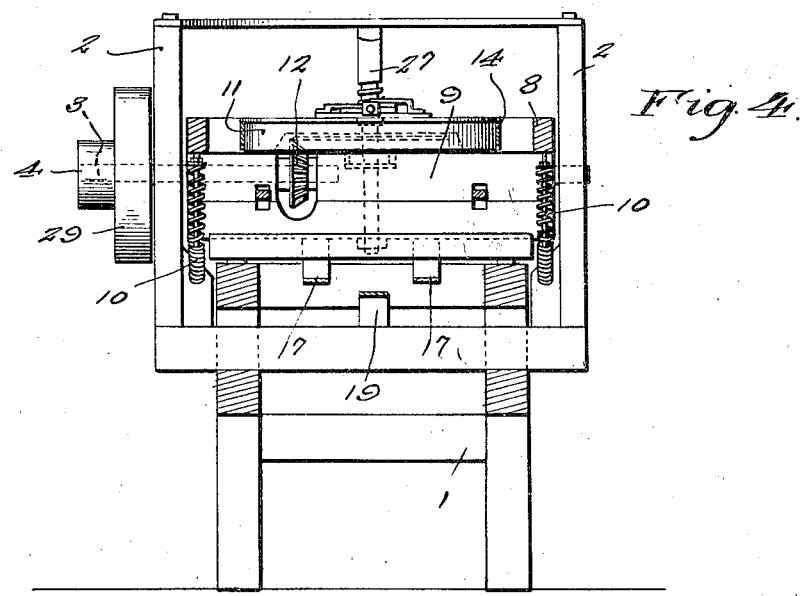

Aug. 21, 1923.

W. A. PUE ET AL 1,465,865

MEAT CUTTER

Original Filed March 24, 1922    4 Sheets-Sheet 3

W. A. Pue
W. N. Sifford   INVENTOR

BY *Victor J. Evans*

ATTORNEY

WITNESSES

Aug. 21, 1923.
W. A. PUE ET AL
1,465,865
MEAT CUTTER
Original Filed March 24, 1922     4 Sheets-Sheet 4
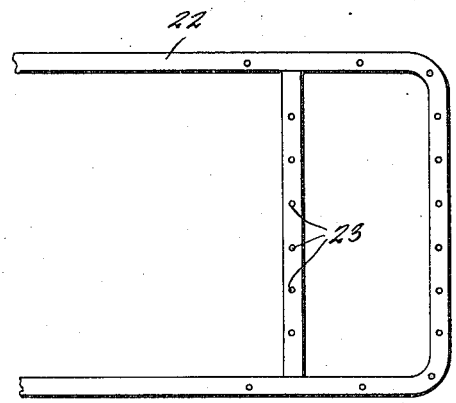
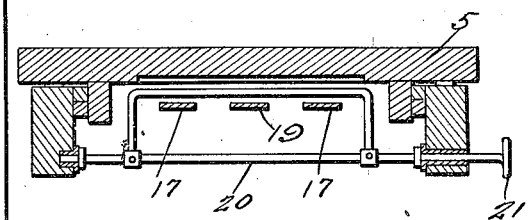
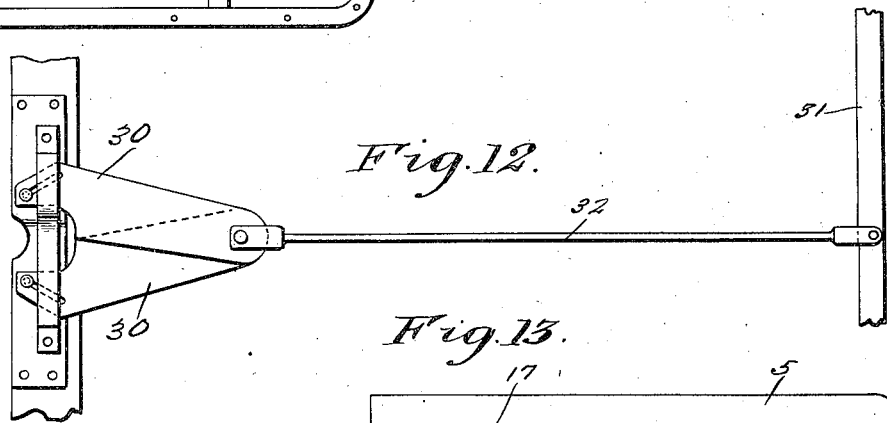
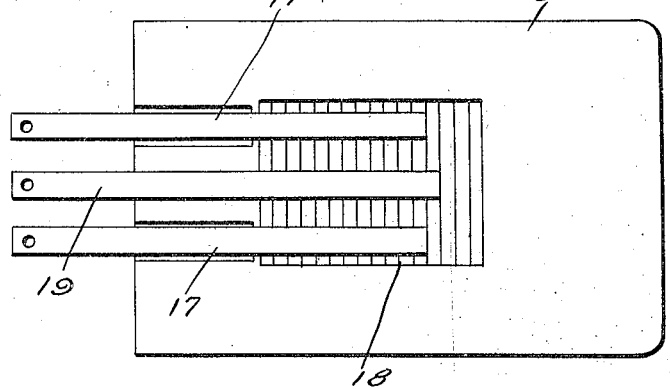
W.A.Pue
W.N.Sifford   INVENTOR
BY *Victor J. Evans*
ATTORNEY
WITNESSES Patented Aug. 21, 1923.

1,465,865

UNITED STATES PATENT OFFICE.

WILLIAM A. PUE AND WILLIAM N. SIFFORD, OF CARLSBAD, NEW MEXICO, ASSIGNORS OF ONE-THIRD TO WILLIAM W. ARLEDGE, OF CARLSBAD, NEW MEXICO.

MEAT CUTTER.

Application filed March 24, 1922, Serial No. 546,449. Renewed January 29, 1923.

*To all whom it may concern:*

Be it known that we, WILLIAM A. PUE and WILLIAM N. SIFFORD, citizens of the United States, residing at Carlsbad, in the county of Eddy and State of New Mexico, have invented new and useful Improvements in Meat Cutters, of which the following is a specification.

This invention relates to a meat cutting machine, the general object of the invention being to provide means for cutting slices from a piece of meat by a saw with means for bringing the saw against the meat, actuating the saw and feeding a table, which carries the meat forwardly.

Another object of the invention is to provide means for holding the meat while being cut and also provide spring means for returning the parts to their inoperative positions after the meat has been cut.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the invention.

Figure 2 is a plan view.

Figure 3 is a longitudinal sectional view on line 3—3 of Figure 2.

Figure is a section on line 4—4 of Figure 3.

Figure 5:
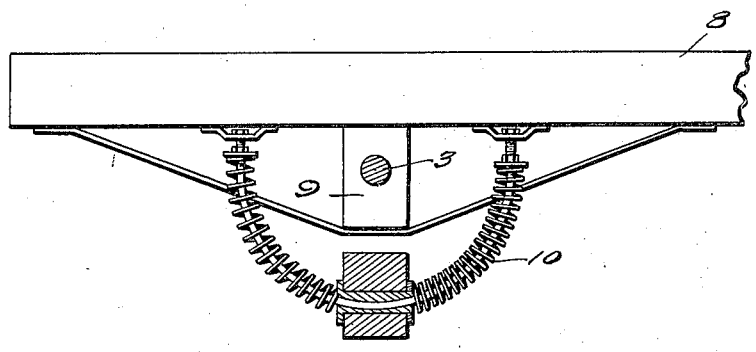

Figure 5 is a detail view, with parts in section, showing the means for normally holding the frame 8 in horizontal position.

Figure 6:
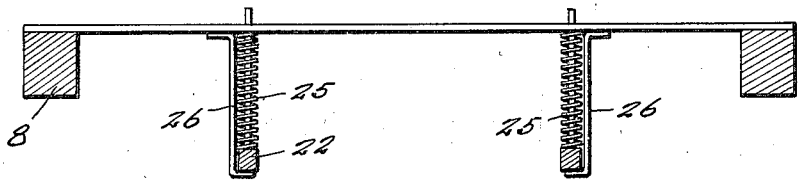

Figure 6 is a transverse sectional view through the frame 8.

Figure 7:
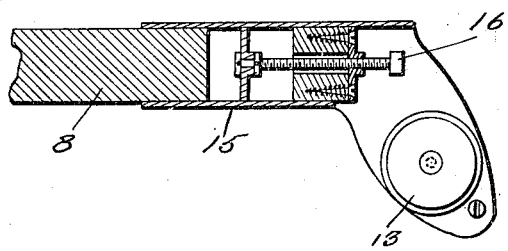

Figure 7 is a horizontal sectional detail view through a portion of the outer end of the frame 8.

Figure 8:
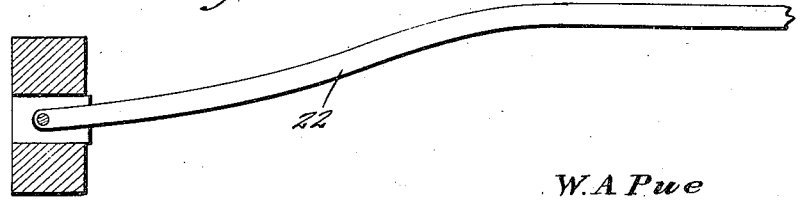

Figure 8 is a detail view showing a part of the holder 22.

Figure 9:
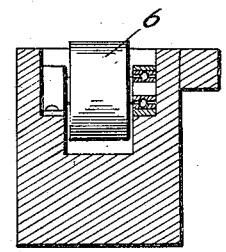

Figure 9 is a detail view showing one of the ball bearings for supporting the table 5.

Figure 10 is a transverse sectional view showing the pawls and their operating means.

Figure 11 is a plan view of the frame 22.

Figure 12 is a detail view of the gripping jaws 30 and their operating means.

Figure 13 is a plan view of the pawls and their associated parts.

In these views 1 indicates a frame which includes the uprights 2 in which the shaft 3 is journaled. This shaft is provided with a pulley 4 so that it can be belted to any suitable source of power. A table 5 is slidably mounted upon the frame, ball bearings 6 being provided for the table. A spring 7 tends to hold the table in its forward position. This table is designed to support the meat which is to be cut. A frame 8 is arranged between the uprights and has its cross piece 9, which is located an appreciable distance from one end of the frame, fitted to receive the shaft so that the frame is pivotally supported by the shaft. Springs 10 are arranged to hold the frame in position it occupies in Figure 1. A large drive wheel 11 is rotatably mounted in the frame and this wheel is geared to the shaft 3 by means of the gears 12 so that the wheel will be rotated when the shaft is rotated. A pair of pulleys 13 are arranged at the rear end of the table and a band saw 14 passes over the wheel 11 and these pulleys. The part of the saw which is between these pulleys will engage the object to be cut. The pulleys are carried by brackets 15 which are adjustable on the frame by means of the screw bolts 16 so that the saw may be tensioned. The lower edge of the cross piece 9 has secured thereto the long pawls 17 which engage the rack 18 on the bottom of the table and a dog 19 on the frame engages said rack, these parts being arranged to feed the table 5 forwardly step by step as the frame 8 is tilted. A crank shaft 20 is arranged on the table and is provided with a handle 21 so that it may be rocked to release the dogs or pawls from the rack when it is desired to return the table to its starting point. The spring 7 will act to return the table to its starting point when the dogs are released. A frame 22 is secured to the cross piece 9 and this frame carries the teeth 23 which are designed to engage the meat to prevent it from moving on the table when engaged by the saw. A spring 24 is secured to this frame and this spring acts to release the meat from the teeth when the frame 8 is raised. The frame 22 is yieldingly connected with the frame 8 by the springs 25 and the brackets 26, these parts being arranged to permit the main frame 8 to have further movement after the frame 22 has engaged the table and its movement has been stopped.

Frame 8 is moved downwardly in the following manner: A screw shaft 27 is supported in the frame and is rotated by means of the shaft 28 which is belted to shaft 3 by the pulleys and belt 29 and this shaft 27 is adapted to be engaged by the gripping jaws 30 which have slot and pin connection with the frame and which are actuated by the lever 31 which is connected with the jaws by the link 32. By moving this lever the jaws can be engaged with and disengaged from the screw shaft 27 and when they are engaged with the shaft the frame will be moved downwardly to bring the saw in engagement with the piece of meat upon the table. When the jaws are released from the screw shafts the springs 10 will raise the frame again.

From the above it will be seen that when the lever 31 is moved to place the dogs in engagement with the screw shaft the frame will be moved downwardly so as to place the saw in engagement with the meat placed upon the table, the saw being revolved by means of the drive wheel 11. Before the saw engages the meat the teeth 23 on frame 22 will engage the meat so as to hold it against movement when engaged by the saw. The table will be fed forwardly before the meat is engaged so as to have the saw cut a piece of meat from the large piece of the desired thickness. After a piece has been cut the hand lever is moved to release the jaws from the screw shafts, when the springs will raise the frame 8 and the frame 22, spring 24 acting to free the meat from the prongs 23. Then by moving the hand lever again the frame can be swung downwardly again to cut a new slice and so on until enough slices have been cut.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. An apparatus of the class described comprising a frame, a table slidably supported thereon, a rockable frame mounted on the frame, a saw carried thereby, power means for driving the saw and means for lowering the frame and feeding the table forwardly.

2. An apparatus of the class described comprising a frame, a table slidably mounted thereon, a rockable frame located in the supporting frame, means for causing the rocking movement of the frame to move the table forwardly, a saw carried by the rocking frame, means for actuating the saw and means for lowering the frame to bring the saw in engagement with the meat upon the table.

3. An apparatus of the class described comprising a frame, a table slidably mounted thereon, a rockable frame located in the supporting frame, means for causing the rocking movement of the frame to move the table forwardly, a saw carried by the rocking frame, means for actuating the saw and means for lowering the frame to bring the saw in engagement with the meat upon the table, such means consisting of a screw shaft, means for rotating the same, jaws upon the frame and means for moving the jaws into and out of engagement with the screw shaft.

4. An apparatus of the class described comprising a supporting frame, a table slidably mounted thereon, spring means for holding the table in its forward position, a rockable frame in the supporting frame, a saw carried thereby, means for causing the movement of the frame to feed the table forwardly, spring means for returning the frame to its raised position, means for lowering the frame upon the table and meat holding means connected with the frame.

5. An apparatus of the class described comprising a supporting frame, a table slidably mounted thereon, spring means for holding the table in its forward position, a rockable frame in the supporting frame, a saw carried thereby, means for causing the movement of the frame to feed the table forwardly, spring means for returning the frame to its raised position, means for lowering the frame upon the table, meat holding means connected with the frame, such means consisting of a prong carrying frame flexibly connected with the first frame and spring means for releasing the meat from the prongs when the frame is raised.

6. An apparatus of the class described comprising a supporting frame, a table slidably mounted thereon, a shaft journaled in the supporting frame, a rocking frame journaled on the shaft, pawl and ratchet mechanism for causing the movement of the rocking frame to feed the table forwardly, a drive wheel mounted in the rocking frame, means for gearing the same with the shaft, pulleys at the rear end of the rocking frame, a band saw passing over the pulleys and wheel, a screw shaft, means for actuating both shafts, jaws on the rocking frame, manually operated means for engaging and disengaging the jaws with the screw shaft and holding means on the rocking frame for engaging the article on the table.

In testimony whereof we affix our signatures.

WILLIAM A. PUE.
WILLIAM N. SIFFORD.